United States Patent [19]
Rowe

[11] 3,800,456
[45] Apr. 2, 1974

[54] FISH HOOK CASE CONSTRUCTION
[76] Inventor: Joseph L. Rowe, 5809 Barberry Ln., Portsmouth, Va. 23703
[22] Filed: May 26, 1972
[21] Appl. No.: 257,448

[52] U.S. Cl. .............................. 43/25.2, 43/57.5 R
[51] Int. Cl. ............................................ A01k 97/06
[58] Field of Search ............ 43/25.2, 57.5 R, 57.5 A

[56] References Cited
UNITED STATES PATENTS

| | | | |
|---|---|---|---|
| 2,993,293 | 7/1961 | Blout | 43/25.2 X |
| 2,849,825 | 9/1958 | Reisner | 43/25.2 |
| 2,878,610 | 3/1959 | Herstedt | 43/25.2 |
| 3,141,258 | 7/1964 | Mayer | 43/25.2 X |
| 1,601,945 | 10/1926 | Davis | 43/25.2 |
| 3,449,851 | 6/1969 | Hall | 43/25.2 |

Primary Examiner—Louis G. Mancene
Assistant Examiner—James H. Czerwonky
Attorney, Agent, or Firm—Watson, Cole, Grindle & Watson

[57] ABSTRACT

A fish hook case of resilient rubber-like material having a hook receiving compartment made accessible through a slit in the case which may be opened by applying inward pressure along the slit from opposite ends thereof. The edges of the slit are both slanted in the same direction thereby preventing the hook from accidentally being removed from its compartment, and sloping anchor studs are provided in the compartment for anchoring various sized hooks therewithin.

2 Claims, 3 Drawing Figures

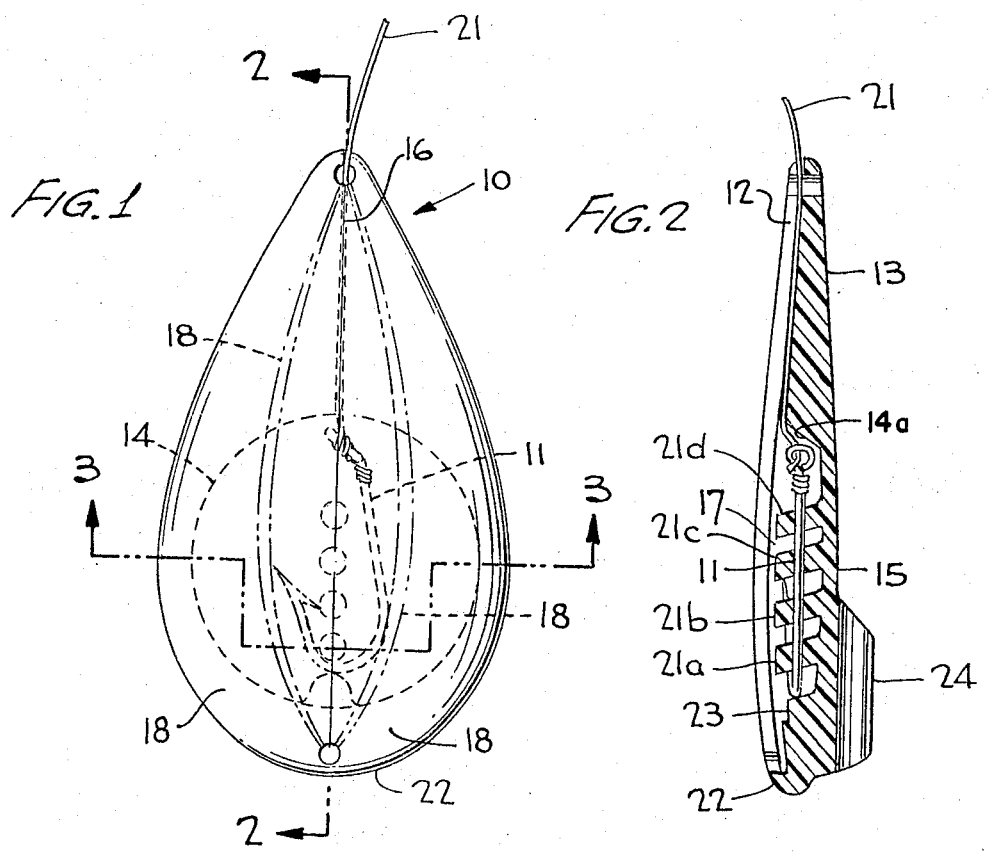
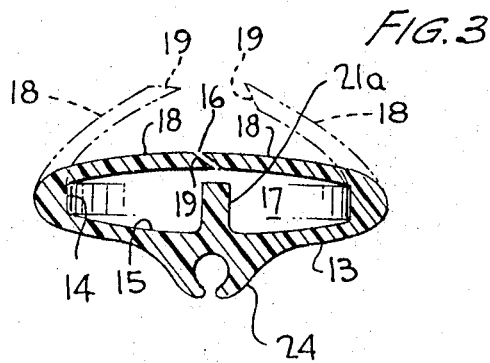

FISH HOOK CASE CONSTRUCTION

This invention relates generally to an encasement for a single fish hook and more particularly to such an encasement constructed of resilient rubber-like material having a compartment for the fish hook made accessible through a normally closed slit extending therealong.

One of the problems encountered by the typical fisherman involves entanglement of the various fish hooks carried to the fishing site. Accordingly, the fishermen must normally disentangle the hooks with extreme caution to avoid injury from contact with the sharp hook ends. Fish hook covers or hook protection devices have been therefore devised for the purpose of encasing and isolating each of the fish hooks. However, such devices have in the past been complicated by their relatively high manufacturing costs and, moreover, by their relative difficulty in quickly and easily removing the fish hook from its protective device after it has been so encased. It is therefore a principal object of the present invention to provide a fish hook case of a relatively simple and inexpensive construction which can be easily and effectively handled for quick removal of the fish hook without exposing the fishermen to injury from the sharp fish hook end.

Another object of this invention is to provide such a fish hook case which is of resilient rubber-like material in the form of a hollow unitary body wherein one wall thereof has a depression in its inner surface defining a compartment for the fish hook and the other of its walls has a slit therein extending along the depression, thereby defining a normally resiliently closed pair of wall portions. The free ends of these wall portions are slanted inwardly to thereby prevent accidental removal of the fish hook from the compartment.

A further object of the present invention is to provide such a fish hook case further including anchor studs in the compartment for anchoring various sized hooks therewithin.

A still further object of the invention is to provide such a fish hook case having means provided thereon for clipping the case on to a fish rod.

Other objects, advantages and other features of the invention will become apparent from the following detailed description of the invention when considered in conjunction with the accompanying drawings, wherein:

FIG. 1 is a top plan view of the fish hook case, constructed in accordance with the present invention;

FIG. 2 is a sectional view of the case taken along the line 2—2 of FIG. 1; and

FIG. 3 is the sectional view of the case taken along the line 3—3 of FIG. 1.

Turning now to the drawings, wherein like reference characters refer to like and corresponding parts throughout the several views, there is shown a cover or case generally designated 10 for a fish hook 11, shown in FIGS. 1 and 2 as being encased within the interior of the cover which is substantially tear-shaped in plan view and is of a unitary body constructed of resilient rubber-like or similar material. Interconnected upper and lower walls 12 and 13, respectively, define the unitary body construction of the case, as clearly shown in the drawing. Lower wall 13 is provided with a depression defining a compartment 17 for the fish hook 11, the depression being constituted by a substantially circular wall 14 having a wall portion 14a sloping toward a bottom wall for a purpose to be hereinafter described.

The wall 12 of the case is provided with a longitudinal slit 16 therein, extending fully along the compartment 17 and being normally closed, due to the resiliency of the body construction. The hook is made easily accessible through slit 16 merely by the application of an inward force along the slit from opposite ends thereof. Accordingly, wall portions 18 of the upper wall 12 will be made to conveniently separate upon application of such force, as is clearly shown in phantom in FIGS. 1 and 3. The fish hook 11 is therefore made fully and completely accessible to the fisherman.

In FIG. 3, it can be clearly seen that the free edges 19 of the upper wall portions 18 are slanted in a common direction. This type of edge construction serves to substantially prevent the fish hook from accidentally falling out of the case.

Moreover, anchor studs 21a, 21b, 21c, 21d are formed integrally with bottom wall 15 and slant slightly forward toward the larger end 22 of the case. A built-up portion 23 is also formed integrally with bottom wall 15 forward of stud 21a. Accordingly, the hook 11 of a size shown in the drawings may be conveniently and effectively anchored in place as the hook end thereof is placed between stud 21a and portion 23, as shown. Smaller sized hooks may also be conveniently anchored in place in a like manner as the hook end thereof is placed either between studs 21a and 21b between studs 21b and 21c, or between studs 21c and 21d, depending on the hook size.

The hook line 21 for the hook extends outwardly of the case through slit 16. The slanting edges 19 of the upper wall portions 18 therefore tightly embrace the hook line and, by tugging slightly on the line, the hook will be forced downwardly toward bottom wall 15 by reason of the forwardly sloping studs 21. Also, the eye of the hook will be likewise forced downwardly as it contacts sloping wall portion 14a.

Clip means 24 is also formed or otherwise secured to the outer surface of lower wall 13 near the end 22 of the case for the purpose of conveniently clipping the case on to a fishing rod between the jaws thereof.

From the foregoing, it can be seen that a simple yet effective fish hook casing has been devised for enabling the fisherman to conveniently carry his fish hook without the likelihood of misplacing it or losing it during his travels. The hook is anchored snugly in place within the casing and is made easily accessible by simply pressing inwardly against opposite ends of slit 16. Also, the casing may be quickly clipped on to the fish rod or may be otherwise carried in the fisherman's pocket without the danger of injury from the sharp hook end. Also, the rubber-like material used for the casing construction avoids any snags by the pointed hook and may be, moreover, easily formed by any well-known dipping or molding process.

Obviously, many modifications and variations of the present invention are possible in the light of the teachings. It is therefore to be understood that within the scope of the appendent claims, the invention may be practiced otherwise than as specifically described.

What is claimed is:

1. A case for retaining a fish hook, comprising a double wall hollow unitary body of resilient rubber-like material, one of said walls having a depression in its inner surface defining a compartment for the fish hook, the other of said walls having a slit therein extending along said depression thereby defining normally resiliently closed wall portions, at least one anchor stud secured to the inner surface of said one wall near one end thereof for anchoring the fish hook within said compartment, said stud extending toward said other wall and sloping toward one end of said body, said compartment having an end wall opposite said stud and sloping away from said other wall and toward the end of said body opposite said one end thereof to thereby facilitate movement of the eye portion of the fish hook inwardly toward said inner surface as its line which extends through said slit is tugged on to move the hook portion of the fish hook in contact with said stud, said compartment being accessible through said slit, one of the free edges of said wall portions forming an acute angle with its wall portion and sloping inwardly toward said inner surface, and the other of the free edges of said wall portions having a slope corresponding to the slope of said one free edge and partially overlapping said one free edge thereby preventing any accidental removal of the fish hook from said compartment between said edges.

2. The case according to claim 1 further including clip means provided on the outer surface of said one wall, said clip means having jaws for clipping the case on to a fishing rod.

* * * * *